United States Patent
Seidel et al.

(10) Patent No.: US 8,154,155 B2
(45) Date of Patent: Apr. 10, 2012

(54) MACHINE TOOL PROTECTION APPARATUS

(75) Inventors: Juergen Seidel, Esslingen (DE); Heiko Braun, Leinfelden-Echterdingen (DE); Benjamin Visel, Schwieberdingen (DE); Juergen Hasch, Stuttgart (DE); Michael Mahler, Leinfelden-Echterdingen (DE); Georg Stellmann, Ludwigsburg (DE); Lars Weikert, Stuttgart (DE); Thomas Brosche, Stuttgart (DE); Alexander Werner Hees, Bietigheim-Bissingen (DE); Sebastian Jackisch, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 161 days.

(21) Appl. No.: 12/635,190

(22) Filed: Dec. 10, 2009

(65) Prior Publication Data
US 2010/0147124 A1    Jun. 17, 2010

(30) Foreign Application Priority Data
Dec. 12, 2008  (DE) .......................... 10 2008 054 559

(51) Int. Cl.
*H02H 11/00* (2006.01)
(52) U.S. Cl. ........................................................ 307/326
(58) Field of Classification Search ................. 307/326; 192/116.5, 130; 340/686.5, 686.6
See application file for complete search history.

(56) References Cited

U.S. PATENT DOCUMENTS
2003/0117023 A1* 6/2003 Avril .............................. 307/39
2004/0226800 A1* 11/2004 Pierga et al. ............. 192/129 R

* cited by examiner

*Primary Examiner* — Jared Fureman
*Assistant Examiner* — Carlos Amaya
(74) *Attorney, Agent, or Firm* — Kenyon & Kenyon LLP

(57) ABSTRACT

A machine tool protection apparatus, for a machine tool, that is provided for monitoring of a protection region associated with a tool, including a first sensor unit that is provided for reception of a first protection signal. The machine tool protection apparatus further includes at least one second sensor unit that is provided for reception of a second protection signal.

17 Claims, 3 Drawing Sheets

MACHINE TOOL PROTECTION APPARATUS

BACKGROUND INFORMATION

A machine tool protection apparatus for a machine tool is already known. The machine tool protection apparatus is provided for monitoring of a protection region associated with a tool, and has a first sensor unit that is provided for reception of a first protection signal.

SUMMARY OF THE INVENTION

The present invention proceeds from a machine tool protection apparatus, for a machine tool, that is provided for monitoring of a protection region associated with a tool, having a first sensor unit that is provided for reception of a first protection signal.

The machine tool protection apparatus has at least one second sensor unit that is provided for reception of a second protection signal. "Provided" is intended in this connection to be understood as, in particular, specifically equipped and/or specifically designed and/or specifically programmed. A "protection region" is furthermore to be understood as, in particular, a region that is made up of points that have a minimum spacing from a tool, in particular from a cutting edge of the tool such as, for example, a saw edge, of at most 10 cm and particularly advantageously at most 5 cm. Both sensor units are preferably provided for monitoring of the protection region, each of the sensor units individually being provided for monitoring of the entire protection region. The configuration according to the present invention advantageously allows redundant monitoring of the protection region to be achieved, and thus a high level of safety to be achieved for a user during operation of the machine tool protection apparatus. In addition, excellent reliability of the machine tool protection apparatus can be achieved by way of the two sensor units. In addition to reception, the first sensor unit can additionally be provided for emission of the first protection signal, and the second sensor unit can be provided for emission of the second protection signal.

The machine tool protection apparatus is suitable for all kinds of machine tools in which monitoring of a protection region disposed around a tool appears useful. The machine tool can be used especially advantageously with sawing machine tools and in particular with circular saws, since because of a particular hazard situation here, a high level of safety and a reduction in the risk of injury to a user during operation of the circular saw can be achieved.

It is further provided that the first sensor unit be embodied differently from the at least second sensor unit in terms of at least one signal parameter. The at least one signal parameter is preferably constituted by a frequency and/or a manner of sensing the protection signals by way of the two sensor units. In addition, "different signal parameters" is intended in particular to preclude the fact that an identical manner of sensing substantially identical protection signals is taken as the basis in the two sensor units, and the latter are merely disposed at different positions. With particular advantage in this context, data of the various sensor units are combined and/or compared with one another in the context of an evaluation in order to monitor the protection region.

Effective and almost uninterrupted monitoring of the protection region can advantageously be achieved if the first sensor unit has a sensing region that at least in part covers a sensing gap of the second sensor unit. In this connection, a "sensing region" is to be understood as, in particular, a frequency region sensed by the sensor unit and/or a sensed angular region and/or a region that can be sensed on the basis of the manner of sensing of the sensor unit. A "sensing gap" is furthermore to be understood as, in particular, an information item and/or a region within the protection region that, in particular because of a manner of sensing of the sensor unit, at least in part cannot be acquired or sensed by way of the sensor unit, and/or the information item and/or the region is disposed outside the sensing region of the sensor unit. At least partially uninterrupted sensing of the protection region can be achieved in this context, and advantageous safety monitoring of the protection region for a user, can thereby be achieved.

Particularly advantageously, at least one of the protection signals is at least in part constituted by a signal in a visible wavelength region. The sensor unit preferably encompasses in this context a video camera and/or further visual sensor means that appear useful to one skilled in the art.

It is further provided that at least one of the protection signals be constituted at least in part by a near/mid-infrared signal. A "near/mid-infrared signal" is to be understood in this connection as, in particular, a signal having a wavelength in a wavelength interval of the infrared spectrum, the infrared spectrum being located below the 15 μm wavelength. In addition, high contrast between human tissue and material can be achieved if the sensitivity region for sensing a radiation is provided in a wavelength interval of the infrared spectrum below the 8 μm wavelength. It is especially advantageous if the wavelength region is a near infrared region. A "near infrared region" is to be understood in this connection as, in particular, a wavelength interval of the infrared spectrum that is located below the 2 μm wavelength, such as in particular a wavelength interval in the IR-A region.

In a further embodiment of the present invention, it is provided that at least one of the protection signals be constituted at least in part by a broadband signal, with the advantageous result that a high information density can be achieved in the protection signal. The broadband signal is preferably constituted by a ultra-broadband signal, in particular by an ultra-broadband radar signal; in this connection, an "ultra-broadband signal" is to be understood as, in particular, an electromagnetic signal that has a usable frequency range having a center frequency in the frequency region from 1 GHz to 15 GHz, and a frequency bandwidth of at least 500 MHz. The ultra-broadband signal, in particular an ultra-broadband radar signal, can preferably be varied, continuously or in sequentially disposed frequency region steps, through the overall frequency region. The sensor unit for emitting the ultra-broadband signal can be provided for continuous or stepwise variation of the present measurement frequency through the overall frequency region, and/or the sensor unit for receiving the ultra-broadband signal can be provided for continuous or stepwise variation of a present reception frequency through the overall frequency region.

It is additionally provided that at least one sensor unit have at least one sensor element that is constituted by a capacitive sensor, with the result that high sensing sensitivity can be achieved and, associated therewith, small changes within the protection region can be sensed quickly. A "capacitive sensor" is to be understood in this context as, in particular, a sensor that is provided for capacitive measurement and/or sensing. Capacitive measurement can be accomplished by measuring a dielectric constant between two electrodes between which, by preference, the protection region is disposed, and/or a triggering action, in particular of a protection region and/or protection mode, can be activated on the basis of a capacitatively sensed contact signal upon contact by the user with the tool. An electrical signal and/or field is preferably generated in order to measure the dielectric constant, such that a change in a dielectric on the basis of a change in a structure within the protection region, for example on the basis of a workpiece, can be sensed within a protection region penetrated by the electrical signal and/or field.

In an advantageous refinement, it is provided that the machine tool protection apparatus have at least one calculation unit that is provided for evaluation of the first protection signal and/or of the second protection signal. A "calculation unit" is to be understood in this connection as, in particular, a unit that can be constituted by a control unit and/or an evaluation unit; the calculation unit can be constituted both by a processor alone and, in particular, by a processor and further electronic components such as, for example, a storage means. Thanks to this configuration, advantageously, isochronous evaluation of the protection signals of the two sensor units can be achieved, and rapid sensing of a possible risk situation in data of at least one of the two sensor units can thus be ascertained particularly rapidly. A calculation unit is preferably provided for each sensor unit of the machine tool protection apparatus, so that independent analysis and/or evaluation of the individual protection signals can moreover be achieved.

Particularly advantageously, the machine tool protection apparatus has a calculation unit that is provided in order to take into consideration data of the first sensor unit in the context of an evaluation of data of the second sensor unit. The reliability of a triggering of a safety mode, for example activation of a brake in order to stop a tool, can advantageously be enhanced in this context. In addition, an advantageous system check, for example a self-test of the machine tool protection apparatus, by way of the two data sets of the two sensor units can furthermore be achieved in this context.

It is further provided that the calculation unit be provided for activation of a safety mode in the presence of at least one risk parameter in at least one of the at least two protection signals. In this connection, a "risk parameter" is to be understood as, in particular, a parameter that indicates in the received or detected signals a body part of the user within the protection region. A "safety mode" is furthermore to be understood as, in particular, an operating mode of the machine tool protection apparatus that, in particular, is activated automatically by the calculation unit and is initiated in order to protect the user, in particular from injury to the user by the tool, for example immediate deceleration of the tool and/or immobilization of the tool, etc. This embodiment can advantageously result in reliable triggering of the safety mode in a hazard situation that is undesirable for the user, on the basis of the two sensor units based, in particular, on different manners of detection.

In an advantageous refinement of the present invention, a method for a machine tool protection apparatus is provided, a protection region being monitored by way of at least one first protection signal and at least one second protection signal. Redundant monitoring of the protection region, and thus a high level of safety for a user during operation of the machine tool protection apparatus, can advantageously be achieved.

It is further provided that in the method, at least one sensing gap of the second protection signal be covered by a sensing region of the first protection signal. At least partially uninterrupted sensing of the protection region, and thus advantageous safety monitoring of the protection region for a user, can be achieved.

DETAILED DESCRIPTION

Figure 1:
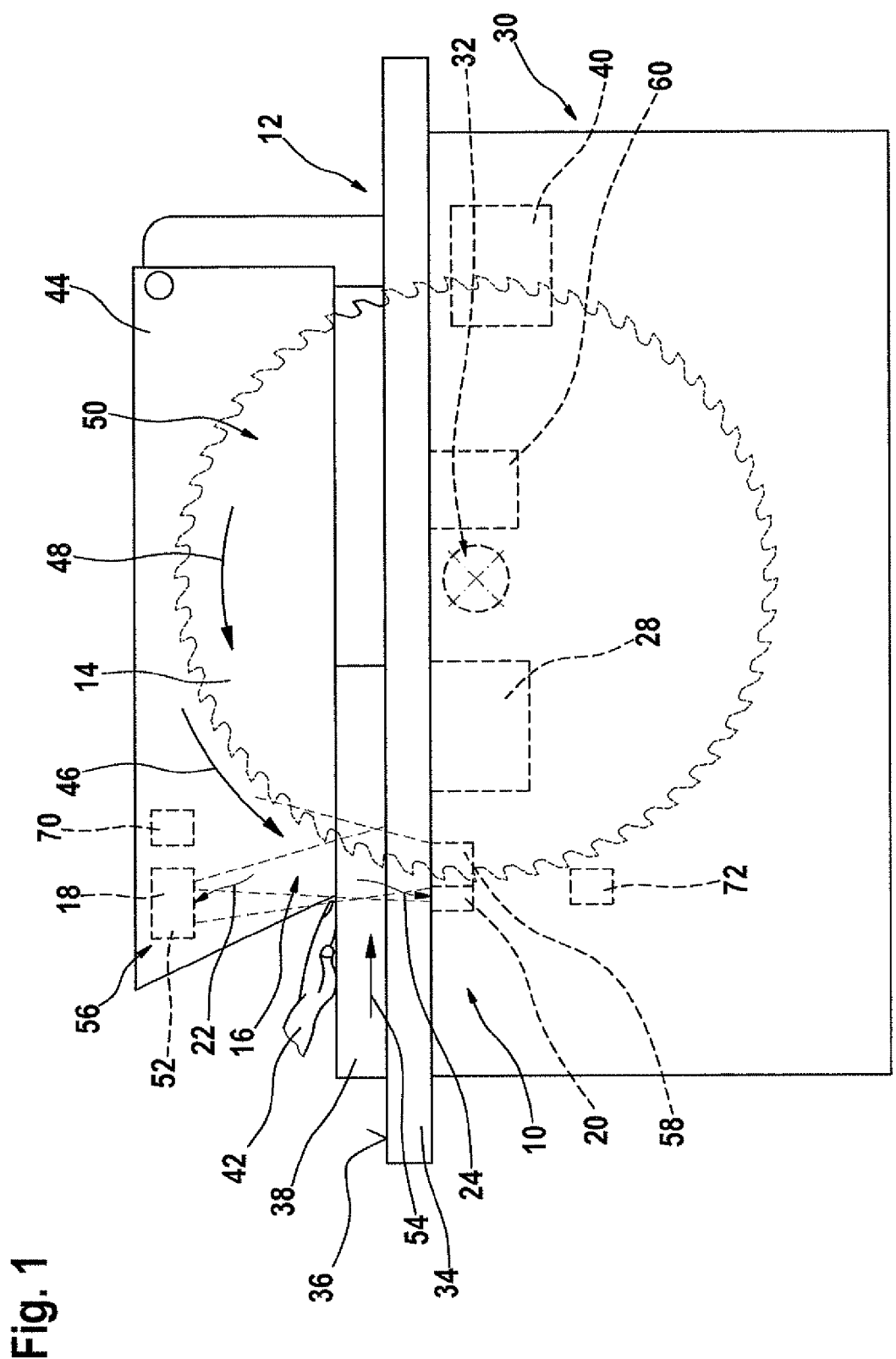
FIG. 1 is a schematic depiction of a machine tool having a machine tool protection apparatus according to the present invention.

FIG. 1 depicts a machine tool 12, constituted by a table saw 30. Table saw 30 has a tool receptacle 32 in which is disposed a tool 14 constituted by a circular saw blade. In an installed state, tool 14 projects through a recess (not further depicted) of a worktable 34 of machine tool 12. Worktable 34 has a work surface 36 that is provided for support of a workpiece 38 that is processed during the operation of machine tool 12. Machine tool 12 further encompasses a motor unit 40 that, during operation, generates a drive torque for tool 14. Machine tool 12 further has a machine tool protection apparatus 10 that is provided in order to protect a user 42 from tool 14 during the operation of machine tool 12. Machine tool protection apparatus 10 has a protective hood 44 that is disposed, along a peripheral direction 46 of tool 14 that extends parallel to a rotation direction 48 of tool 14, around a subregion 50 of tool 14 that projects out of worktable 34.

Machine tool monitoring apparatus 10 further has a first sensor unit 18 that is provided for emission and reception of a first protection signal 22, and a second sensor unit 20 that is provided for emission and reception of a second protection signal 24, first and second sensor unit 18, 20 being respectively provided for monitoring a protection region 16, associated with tool 14, during the operation of machine tool monitoring apparatus 10. First sensor unit 18 encompasses an infrared sensor 52 and is disposed in a front region 56 in protective hood 44 along a working direction 54 in which workpiece 38 is moved by user 42 toward tool 14. During operation of machine tool protection apparatus 10, infrared sensor 52 is provided for emission of first protection signal 22, first protection signal being constituted by a near/mid-infrared signal. First protection signal 22 is reflected by workpiece 38 and/or by a body part of user 42, for example a hand of user 42, and is then received by infrared sensor 52. Second sensor unit 20 encompasses an ultra-broadband sensor 58 and is disposed beneath worktable 34, and is provided in order to emit second protection signal 24, which is constituted by an ultra-broadband signal. The ultra-broadband signal emitted by ultra-broadband sensor 58 is reflected by workpiece 14 and/or by a body part of user 42, and the reflected second protection signal 24 is then received by ultra-broadband sensor 58.

First and second sensor unit 18, 20, and first and second protection signal 22, 24, differ in terms of at least one signal parameter, the signal parameter being constituted in this context by a parameter of a manner of sensing. First sensor unit 18 has a sensing region that covers a sensing gap of a sensing region of second sensor unit 20. The sensing gap of infrared sensor 52 or of the sensing region of infrared sensor 52 is constituted, for example, by an exclusion of sensing of a hand of user 42 if a glove is being worn. Sensing of the hand of user 42 can be accomplished in this context by ultra-broadband sensor 58. In addition, second sensor unit 20 has a sensing region that covers a sensing gap of a sensing region of first sensor unit 18. The sensing gap of second sensor unit 20 or of the sensing region of ultra-broadband sensor 58 is constituted, for example, by an exclusion of sensing of metal, and an exclusion of sensing of freshly cut wood. The sensing of metal or of freshly cut wood can be accomplished here by way of infrared sensor 52.

Figure 2:
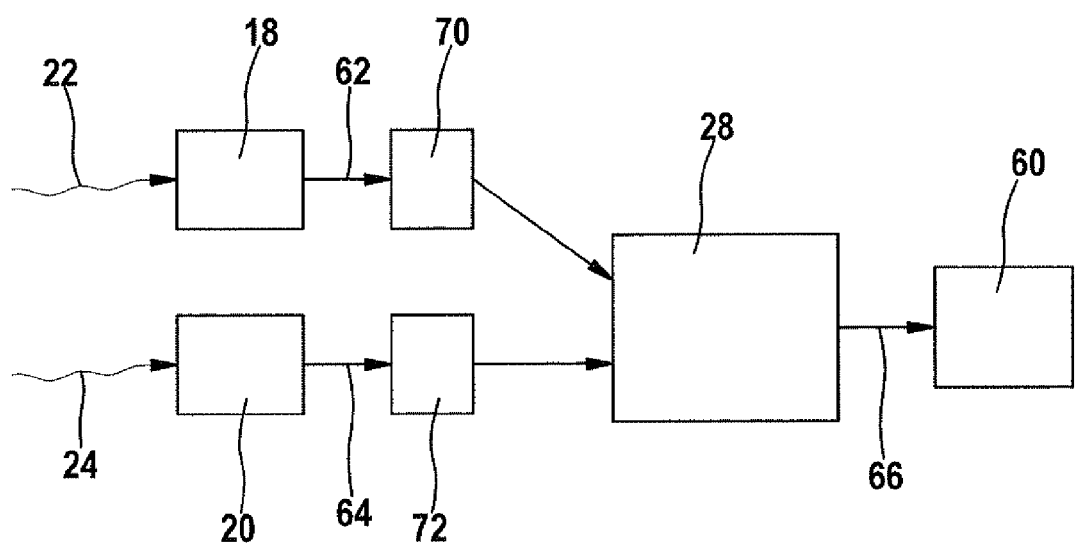
FIG. 2 is a block diagram of a manner of operation of the machine tool protection apparatus.

Machine tool protection apparatus 10 furthermore has three calculation units 28, 70, 72 that are provided, during operation, for evaluation of protection signals 22, 24 sensed by the two sensor units 18, 20 (FIGS. 1 and 2). Two of the calculation units 70, 72 are associated each with one of the two sensor units 18, 20, and provided exclusively for evaluation of protection signals 22, 24 sensed by the respective sensor unit 18, 20, so that rapid data evaluation can take place. For this purpose, calculation unit 70 associated with first sensor unit 18 is disposed in front region 56 in protective hood 44, and calculation unit 72 associated with second sensor unit 20 is disposed beneath worktable 34. A signal value 62, 64 appropriate for the respective received protection signal 22, 24, for example a voltage value, is generated by each of the two sensor units 18, 20 at a respective output and directed to the respective calculation unit 70, 72. Calculation units 70, 72 evaluate signal values 62, 64 for the respective sensor unit 18, 20 separately from one another. The evaluated data of the two sensor units 18, 20 are then directed via a data line (not further depicted) to third calculation unit 28, which compares the two data sets of the two sensor units 18, 20 with one another. Machine tool protection apparatus 10 furthermore has an actuator unit 60 that, in the presence of a risk parameter 66 in one of the two protective signals 22, 24, for example detection of a hand of user 42 within protection region 16, is activated in third calculation unit 28 and by said unit and triggers a safety mode, for example an immediate deceleration of tool 14 and/or further safety modes that appear useful to one skilled in the art. For triggering of the safety mode, a risk parameter 66 must be present, during the operation of machine tool protection apparatus 10, in at least one of the two data sets of the two protection signals 22, 24 of the two sensor units 18, 20. In an alternative embodiment, it is conceivable in principle that the two calculation units 70, 72 and third calculation unit 28 are embodied integrally with one another.

In addition, by way of third calculation unit 28, detection or sensing of objects within protection region 16 by one of the two sensor units 18, 20 can be checked using the further sensor unit 18, 20. In this context, in third calculation unit 28 a detection of objects within protection region 16 in one of the two data sets of one of sensor units 18, 20 is confirmed by the further data set of further sensor unit 18, 20 by the fact that the two data sets are compared with one another by third calculation unit 28. If a workpiece 38 made of metal is present in protection region 16, for example, a high reflection signal is sensed in ultra-broadband sensor 58; in said signal, it is almost impossible to distinguish between a hand of user 42 and workpiece 38 in protection region 16. By way of first protection signal 22 of infrared sensor 52, both workpiece 38 and its material are determined in first calculation unit 70, and detection by ultra-broadband sensor 58 is thus confirmed in third calculation unit 28. In addition, a distinction between a hand of user 42 and workpiece 38 made of metal can be accomplished by way of first protection signal 22 of infrared sensor 52.

Figure 3:
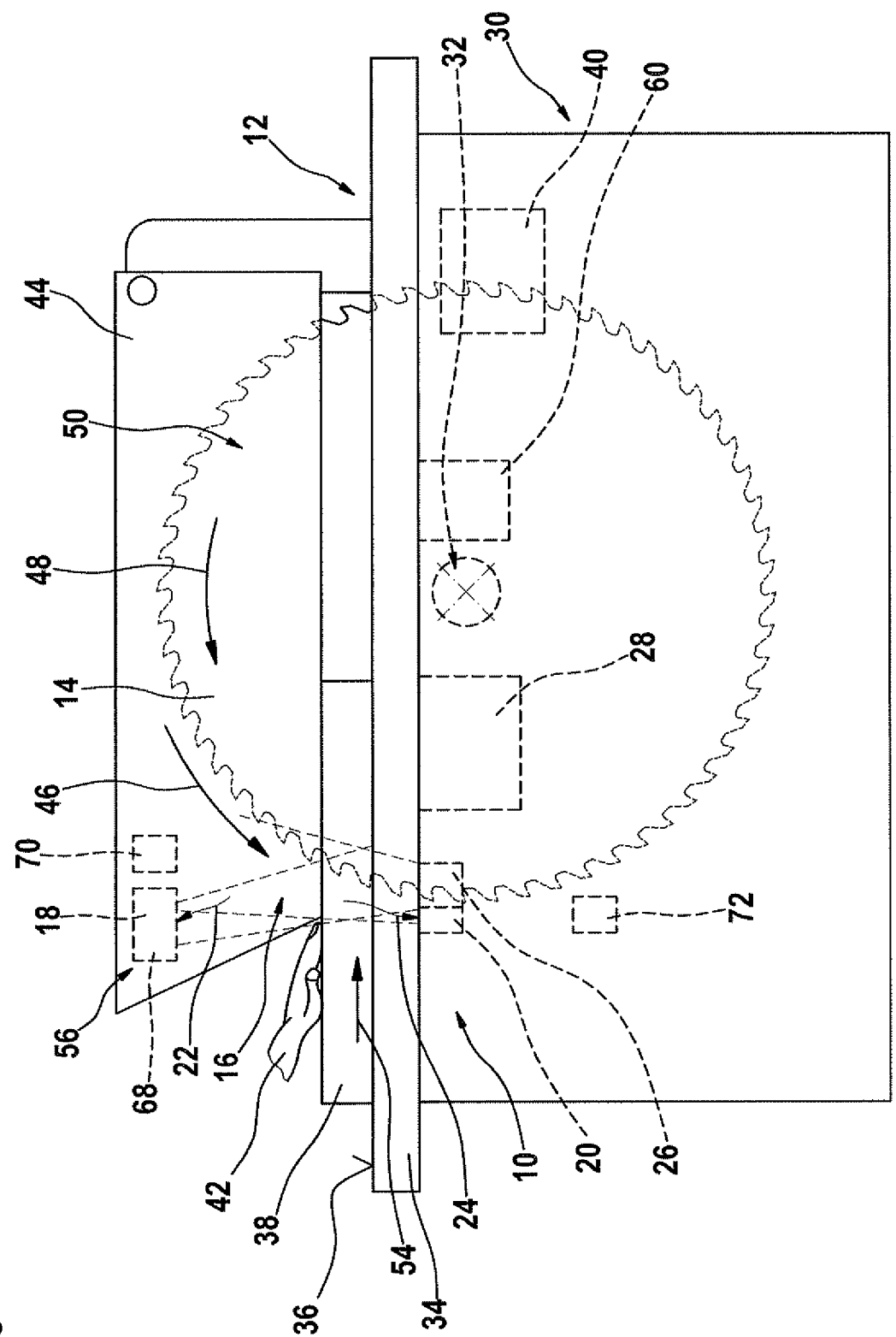
FIG. 3 schematically depicts an embodiment, alternative to FIG. 1, of the machine tool protection apparatus.

FIG. 3 depicts an exemplifying embodiment alternative to FIGS. 1 and 2. Components, features, and functions that remain substantially the same are consistently labeled with the same reference characters. The description below is confined substantially to the differences with respect to the exemplifying embodiment in FIGS. 1 and 2; with regard to components, features, and functions that remain the same, reference may be made to the description of the exemplifying embodiment in FIGS. 1 and 2.

FIG. 3 depicts a machine tool 12, constituted by a table saw 30, having an embodiment of a machine tool protection apparatus 10 as an alternative to FIGS. 1 and 2. Machine tool protection apparatus 10 has a first sensor unit 18 that is constituted by a video camera 68 and is disposed within a protective hood 44 of a tool 14 of circular saw 30. First sensor unit 18 is provided for reception of a first protection signal 22 that has a wavelength in a visible wavelength region. Machine tool protection apparatus 10 furthermore has a second sensor unit 20 that has a sensor element constituted by a capacitative sensor 26. Capacitative sensor 26 is provided for reception or sensing of a second protection signal 24; capacitative sensor 26 can be designed in such a way that based on sensing of a dielectric value of protection region 16, a human body part can be sensed in protection region 16, and/or sensing of the human body part exists only upon contact by the human body part with tool 14.

Evaluation of the two protection signals 22, 24 of the two sensor units 18, 20 is accomplished analogously to the description regarding the exemplifying embodiment in FIGS. 1 to 2.

In a further embodiment of the invention, it is further conceivable that the two sensor units 18, 20 can be constituted by a video camera 68 and an ultra-broadband sensor 58, or by an infrared sensor 52 and a capacitative sensor 26, or by an ultra-broadband sensor 58 and a capacitative sensor 26, and/or by further combinations of sensor units 18, 20 within machine tool protection apparatus 10 that appear useful to one skilled in the art.

What is claimed is:

1. A machine tool protection apparatus for monitoring of a protection region associated with a tool, the apparatus comprising:
    a first sensor unit for emission and reception of a first protection signal to monitor the protection region; and
    at least one second sensor unit for emission and reception of at least one second protection signal to monitor the protection region,
    wherein the first sensor unit is embodied differently from the at least one second sensor unit in terms of at least one signal parameter, wherein data from the first sensor unit is combined and/or compared with data from the at least one second sensor unit, wherein the monitoring of the protection region is optimized on the basis of the combined and/or compared data.

2. The machine tool protection apparatus according to claim 1, wherein the first sensor unit has a sensing region that at least in part covers a sensing gap of the second sensor unit.

3. The machine tool protection apparatus according to claim 1, wherein one of the protection signals is at least in part constituted by a signal in a visible wavelength region.

4. The machine tool protection apparatus according to claim 1, wherein one of the protection signals is constituted at least in part by a near/mid-infrared signal.

5. The machine tool protection apparatus according to claim 1, wherein one of the protection signals is constituted at least in part by a broadband signal.

6. The machine tool protection apparatus according to claim 1, wherein at least one of the sensor units has at least one sensor element that is constituted by a capacitative sensor.

7. The machine tool protection apparatus according to claim 1, further comprising at least one calculation unit for evaluation of at least one of the first protection signal and the second protection signal.

8. The machine tool protection apparatus according to claim 1, further comprising a calculation unit for taking into consideration data of the first sensor unit in the context of an evaluation of data of the second sensor unit.

9. The machine tool protection apparatus according to claim 8, wherein the calculation unit activates a safety mode in the presence of at least one risk parameter in at least one of the at least two protection signals.

10. The machine tool protection apparatus according to claim 1, wherein the apparatus is for a machine tool.

11. The machine tool protection apparatus according to claim 1, wherein the first sensor unit is an infrared sensor and the at least one second sensor unit is a radar sensor.

12. The machine tool protection apparatus according to claim 1, wherein the first sensor unit is an infrared sensor and the at least one second sensor unit is a capacitive sensor.

13. The machine tool protection apparatus according to claim 1, wherein the first sensor unit is a radar sensor and the at least one second sensor unit is a capacitive sensor.

14. The machine tool protection apparatus according to claim 1, wherein at least one of a (i) system check and (ii) self-test of the machine tool protection apparatus is performed on the basis of the combined and/or compared data.

15. The machine tool protection apparatus according to claim 1, wherein a safety mode is activated on the basis of the combined and/or compared data.

16. A method for monitoring a protection region associated with a tool, comprising:
    monitoring the protection region as a function of a first protection signal emitted by and received by a first sensor unit of a machine tool protection apparatus and at least one second protection signal emitted by and received by at least one second sensor unit of the machine tool protection apparatus,
    wherein the first sensor unit is embodied differently from the at least one second sensor unit in terms of at least one signal parameter, wherein data from the first sensor unit is combined and/or compared with data from the at least one second sensor unit, wherein the monitoring of the protection region is optimized on the basis of the combined and/or compared data.

17. The method according to claim 16, wherein at least one sensing gap of the second protection signal is covered by a sensing region of the first protection signal.

* * * * *